(12) United States Patent
Schmid et al.

(10) Patent No.: US 7,014,383 B2
(45) Date of Patent: Mar. 21, 2006

(54) SHEAR WALL HOLD-DOWNS AND WALL ANCHOR CONNECTORS

(76) Inventors: Ben L. Schmid, 203 Pearl Ave., Balboa Island, CA (US) 92662; Stephen C. Tobin, 817 E. Santa Ana Blvd., Santa Ana, CA (US) 92701

( * ) Notice: Subject to any disclaimer, the term of this patent is extended or adjusted under 35 U.S.C. 154(b) by 0 days.

(21) Appl. No.: 10/371,102

(22) Filed: Feb. 21, 2003

(65) Prior Publication Data
US 2004/0165942 A1 Aug. 26, 2004

(51) Int. Cl.
*F16B 9/00* (2006.01)

(52) U.S. Cl. ............... 403/231; 403/403; 52/167.3; 52/295; 248/300

(58) Field of Classification Search .......... 403/231, 403/403; 52/702, 712, 295, 289, 167.3, 236.8; 411/161, 188, 402, 411, 387.1, 387; 248/300
See application file for complete search history.

(56) References Cited

U.S. PATENT DOCUMENTS

| | | | |
|---|---|---|---|
| 2,871,752 A * | 2/1959 | Stern | 411/387.1 |
| 4,005,942 A | 2/1977 | Gilb | |
| 4,192,118 A * | 3/1980 | Gilb | |
| 4,480,941 A | 11/1984 | Gilb et al. | |
| 4,665,672 A | 5/1987 | Commins et al. | |
| 4,744,192 A * | 5/1988 | Commins | |
| 4,825,621 A * | 5/1989 | Jensen | 52/702 |
| 5,092,097 A * | 3/1992 | Young | 52/702 |
| 5,183,359 A * | 2/1993 | Barth | 411/188 |
| 5,249,404 A * | 10/1993 | Leek et al. | 52/702 |
| 5,467,570 A * | 11/1995 | Leek | 52/712 |
| 5,516,248 A * | 5/1996 | DeHaitre | 411/387.2 |
| 5,979,130 A | 11/1999 | Gregg et al. | |
| 6,109,850 A | 8/2000 | Commins | |
| 6,112,495 A * | 9/2000 | Gregg et al. | 52/295 X |
| 6,158,188 A * | 12/2000 | Shahnazarian | 52/702 |
| 6,250,041 B1 * | 6/2001 | Seccombe | 52/702 X |
| 6,470,644 B1 * | 10/2002 | James et al. | 52/745.06 |

\* cited by examiner

*Primary Examiner*—Daniel P. Stodola
*Assistant Examiner*—Michael P. Ferguson
(74) *Attorney, Agent, or Firm*—Christie, Parker & Hale, LLP (57) ABSTRACT

A connector for securing a first building structural member to a second building structural member is provided. The connector includes a seat member with an opening for receiving an anchor bolt that secures the connector to the second building structural member. The connector also includes first and second side members that connect to the seat member and a back member that extends between the first and second side members, wherein the back member includes a plurality of shear openings for receiving shear fasteners that secure the connector to the first building structural member and resist shear forces only and at least one tension opening for receiving a tension fastener that secures the connector to the first building structural member and resists tension forces only.

22 Claims, 7 Drawing Sheets

SHEAR WALL HOLD-DOWNS AND WALL ANCHOR CONNECTORS

FIELD OF THE INVENTION

The present invention relates generally a connector for a building structure and more particularly to a connector for strengthening a connection between structural members of a building to prevent either major damage or failure of the structural members during cataclysmic events such as earthquakes, high winds, hurricanes and tornadoes.

BACKGROUND

Earthquakes, high winds, hurricanes and tornadoes can impose cataclysmic forces on buildings that cause major and expensive damage as well as structural failure. To counteract these forces, it has become common practice to add connectors between the structural members of a building in areas where such cataclysmic forces can occur. For example, a connector can be added to strengthen a connection between a framed wall and a building foundation to increase resistance to shifting of the framed wall relative to the building foundation. Similarly a connector is required to form a connection between a concrete or masonry wall and the roof structure.

Current connectors are inadequate for the cataclysmic forces that some building structures require and/or have inefficient designs that require too many fasteners to mount the connector to the building structure. Accordingly, a need exists for an improved connector for strengthening the connections between structural members of a building.

SUMMARY

In one embodiment, the present invention includes a connector for securing a first building structural member to a second building structural member. The connector includes a seat member with an opening for receiving an anchor bolt that secures the connector to the second building structural member. The connector also includes first and second side members that connect to the seat member and a back member that extends between the first and second side members, wherein the back member includes a plurality of shear openings for receiving shear fasteners that secure the connector to the first building structural member and resist shear forces only and at least one tension opening for receiving a tension fastener that secures the connector to the first building structural member and resists tension forces only.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF EMBODIMENTS OF THE INVENTION

Figure 1A:
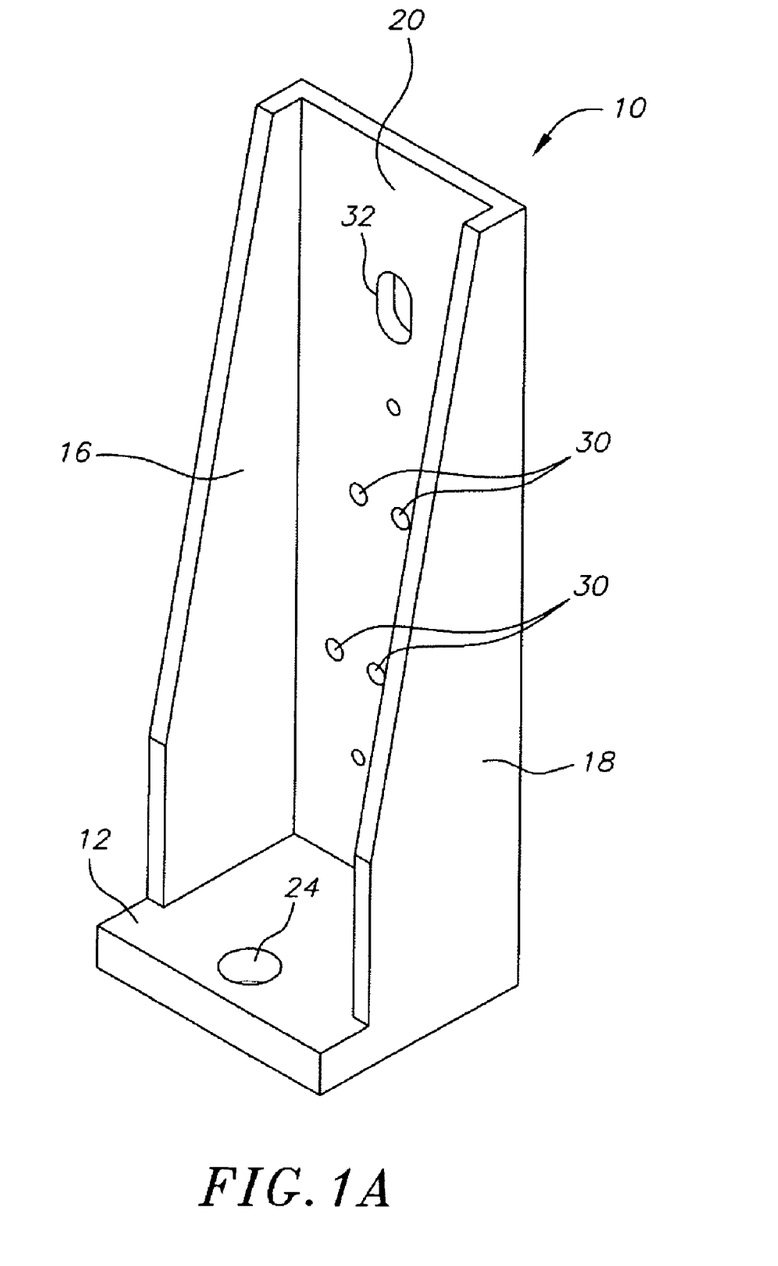
FIG. 1A is a perspective view of an exemplary embodiment of a connector according to the present invention.
Figure 1B:
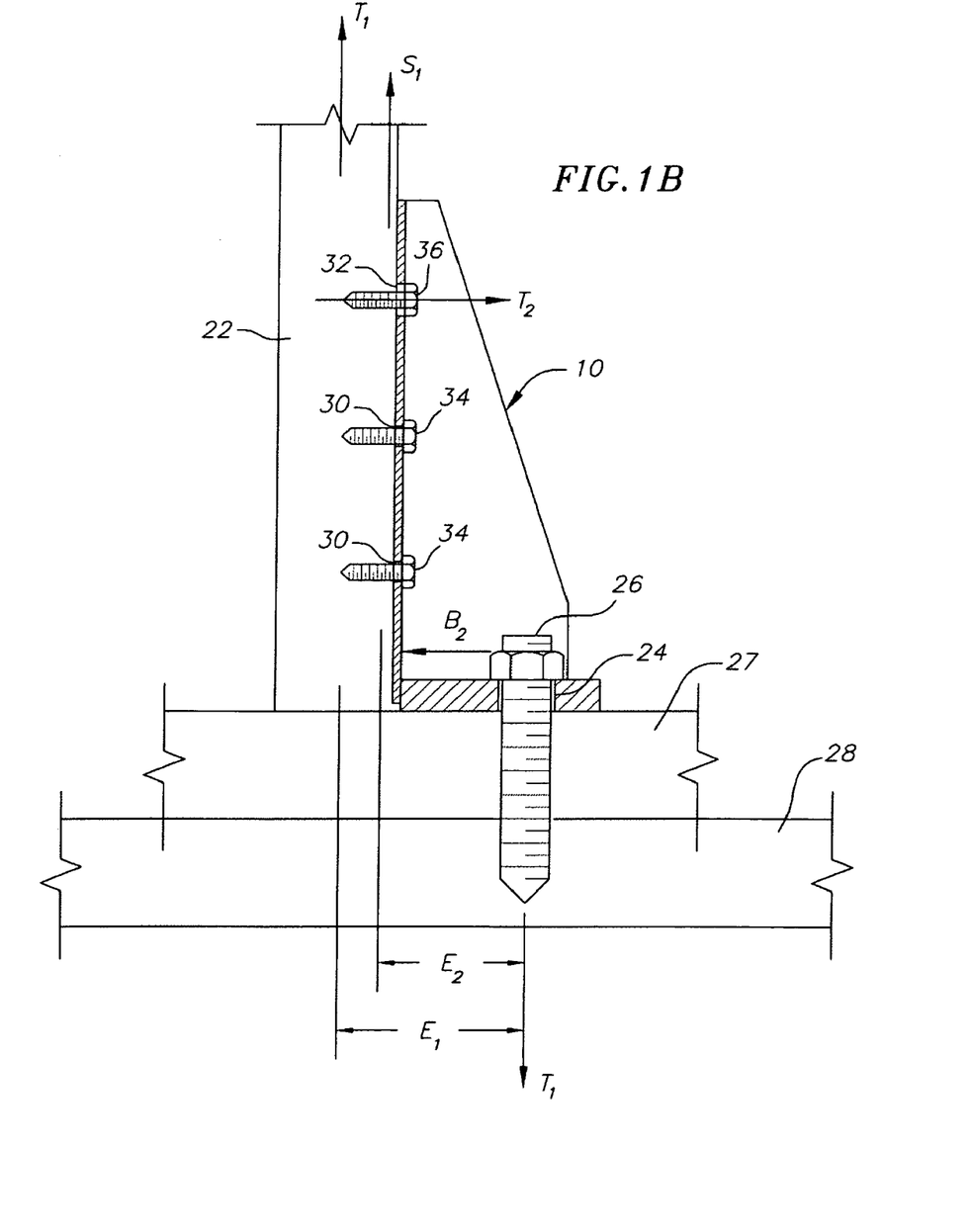
FIG. 1B is a cross sectional view of the connector of FIG. 1A, wherein the connector is secured to a first building structural member and to a second building structural member.

As shown in FIGS. 1A–1B, an exemplary embodiment of the present invention is directed to a connector 10 for strengthening a connection between a first building structural member 22 and a second building structural member 28 through a wood sill plate or ledger member 27. For example, the first building structural member 22 may be a wooden stud or roof or floor frame member and the second building structural member 28 may be a building foundation, such as a concrete foundation, or a concrete or masonry wall.

The connector 10 includes a seat member 12, a first side member 16 connected to the seat member 12, a second side member 18 connected to the seat member 12, and a back member 20 extending between the first and second side members 16 and 18. The seat member 12 includes an opening 24 for receiving an anchor member 26 that secures the connector 10 to the second building structural member 28. The back member 20 includes a plurality of openings (as will be discussed in detail below) for receiving fasteners that secure the connector 10 to the first building structural member 22.

For example, in one embodiment the back member 20 includes a plurality of shear openings 30, such as substantially circular openings, and at least one tension opening 32, such as a vertically slotted opening. The shear openings 30 are for receiving fasteners 34 (hereinafter shear fasteners 34) that secure the connector 10 to the first building structural member 22 and resist shear forces $S_1$ only. The at least one tension opening 32 is for receiving a fastener 36 (hereinafter tension fastener 36) that secures the connector 10 to the first building structural member 22 and resists tension forces $T_2$ only.

Connectors of the prior art have back members with openings for receiving fasteners that are responsible for resisting both shear and tension forces. By contrast, the connector 10 of the present invention includes the back member 20 having shear openings 30 for receiving shear fasteners 34 that resist shear forces only and at least one tension opening 32 for receiving tension fasteners 36 that resist tension forces only. By dividing the forces acting on the connector 10 into tension forces and shear forces, the connector 10 is able to resist a larger amount of force using less fasteners than is possible using connectors of the prior art, where the fasteners must simultaneously resist both shear and tension forces.

FIG. 1B, shows the connector 10 attached to a first building structural member 22 and a second building structural member 28, as well as some of the forces acting on the connector 10, the first building structural member 22, and the second building structural member 28. For example, $T_1$ is a tension force that external forces exert on the first building structural member 22. This tension force $T_1$ is also equal and opposite to the tension force on the anchor member 26. $E_1$ is an eccentric force between the two opposing tension forces $T_1$. The eccentric force $E_1$ is resisted by the first building structural member 22 in combined tension and bending. $S_1$ is a resultant of total shear developed by the shear fasteners 34 that are in bearing against the first building structural member 22. $E_2$ is an eccentric force between the combined bearing force $S_1$ of the shear fasteners 34 and the tension force $T_1$ on the anchor member 26. The eccentric force $E_2$ creates a moment that is resisted by the connector 10. This moment is also resisted by the tension fastener 36 with force $T_2$ and an equal force $B_2$ that bears against the first building structural member 22 at the base of the connector 10.

Figure 2A:
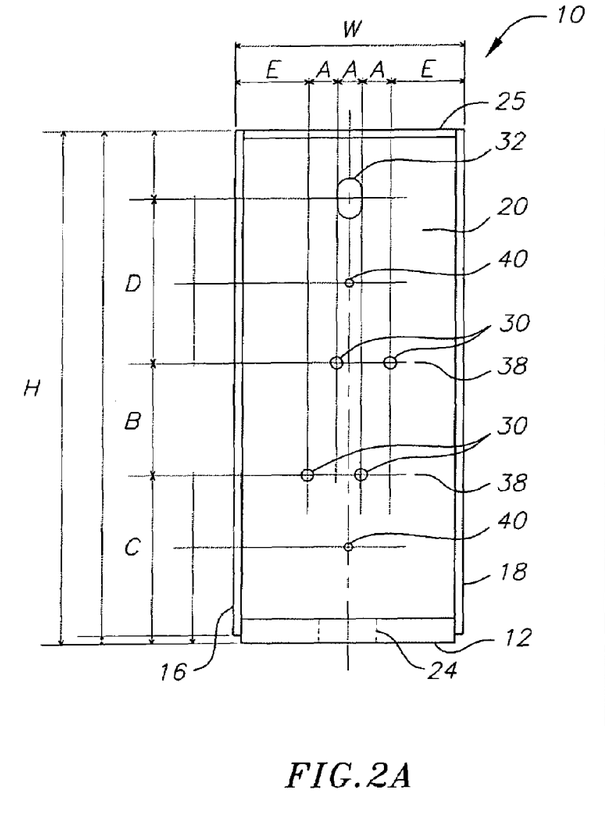
FIG. 2A is a front view of an exemplary embodiment of a connector according to the present invention.
Figure 2B:
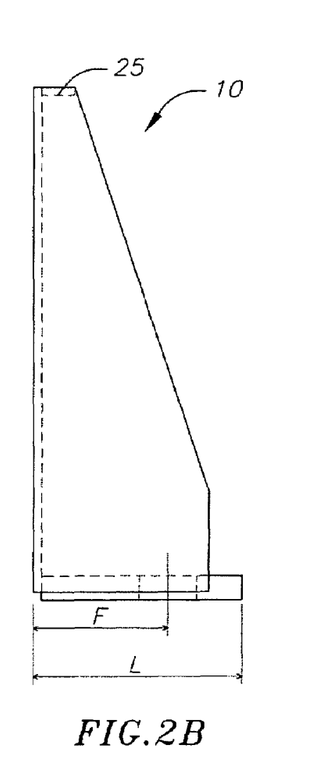
FIG. 2B is a side view of the connector of FIG. 2A.

In one embodiment, as shown in FIGS. 2A and 2B, the shear openings 30 are arranged in at least two rows 38 that each have at least two shear openings 30. Each shear opening 30 may have the same or a similar shape, such that each shear opening 30 accommodates a similar sized shear fastener 34. For example, each shear opening 30 may be circular and have substantially the same diameter.

Each row 38 of shear openings 30 is vertically spaced apart by a distance B from its vertically adjacent row or rows 38, with the lowermost row 38 being vertically spaced a distance C from a bottom surface of the seat member 12. Each row 38 may also be laterally staggered from its vertically adjacent row or rows 38. For example, in the depicted embodiment, each row 38 is laterally staggered a distance A from its vertically adjacent row 38. In addition, the shear openings 30 of each row 38 may be laterally spaced apart by a distance of 2A. Also in the depicted embodiment, the shear opening 30 that is laterally nearest to the first side member 16 is spaced a lateral distance E from an outer surface of the first side member 16 and the shear opening 30 that is laterally nearest to the second side member 18 is spaced the lateral distance E from an outer surface of the second side member 18.

Figures 5A, 5B:
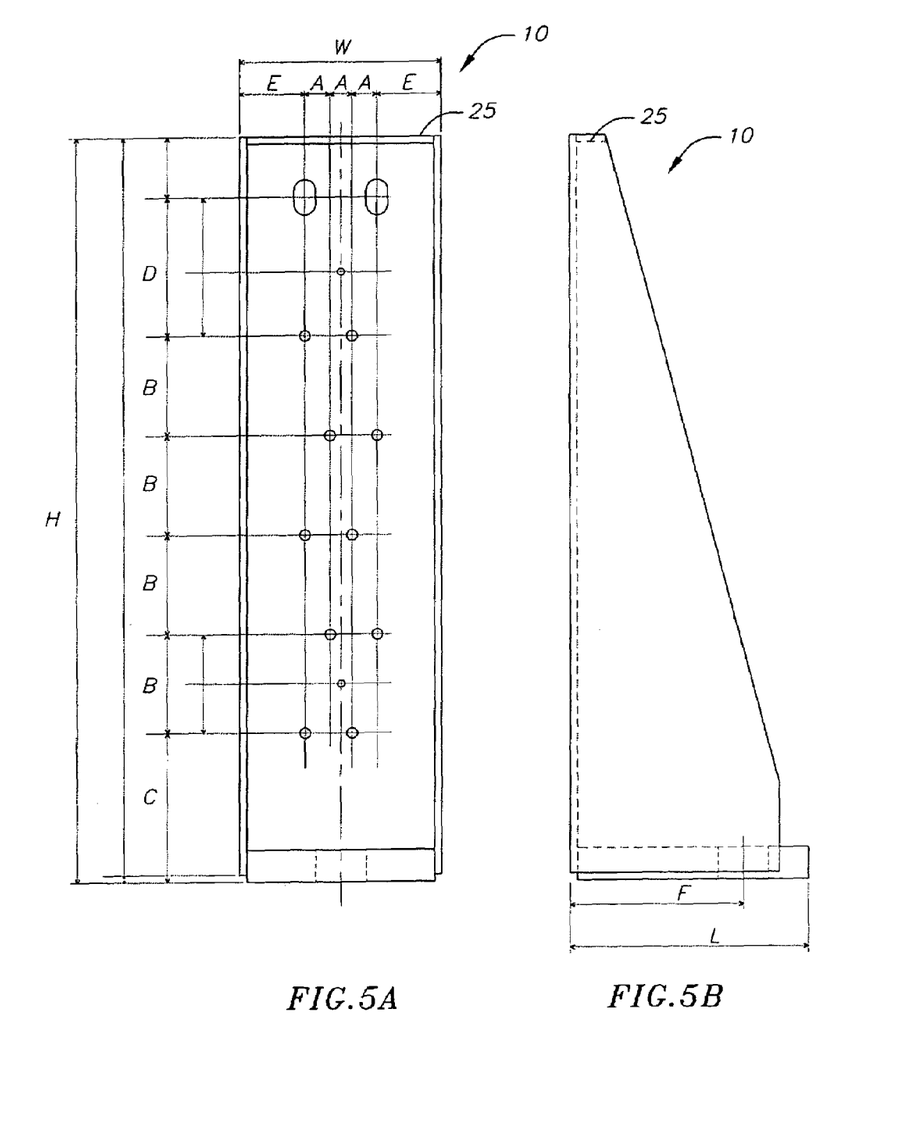
FIG. 5A is a front view of another exemplary embodiment of a connector according to the present invention.
FIG. 5B is a side view of the connector of FIG. 5A.

Preferably, the at least one tension opening 32 is disposed in an upper portion of the connector 10 and is formed as a vertical slot. In the depicted embodiment, the at least one tension opening 32 is displaced a vertical distance D from the uppermost row 38 of shear openings 30. In embodiments where the connector 10 includes one tension opening 32, it is preferred that the tension opening 32 is approximately centered with respect to a width W of the connector 10. In embodiments where the connector 10 includes more than one tension opening 32, it is preferred that the tension openings 32 are symmetrically spaced with respect to the vertical axis of the connector 10 (as shown in FIG. 5A).

The first side member 16, the second side member 18, the back member 20 and the seat member 12 may form one integral part. Alternatively, one or more of the components may be welded to one or more of the other components. For example, in one embodiment the first side member 16, the second side member 18 and the back member 20 form one integral part that is welded to the seat member 12. Preferable, the connector 10 is made of a structural steel, such as ASTM A-36. In one embodiment, the connector 10 further includes a reinforcing member 25. The reinforcing member 25 extends between and is connected to the first and second side members 16 and 18. In one embodiment, such as that shown in FIGS. 2A and 2B, the reinforcing member 25 extends from the back member 20 at an upper portion thereof. The reinforcing member 25 adds structural stability to the connector by resisting a moment on the connector 10. In one embodiment, the reinforcing member 25 may be integrally welded to the first and second side members 16 and 18. The thickness and physical dimension of members 12, 16, 18, 25 and 20 are determined by the strength required to resist the movement and deflection caused by the eccentricity E2 (as shown in FIG. 1B) between the anchor member 26 and the adjacent face of the wood member 22.

In the depicted embodiment, the seat member 12 laterally protrudes from the side members 16 and 18. The seat member opening 24 is laterally displaced a distance F from a back surface of the back member 20 along a length L of the connector 10 and is preferably approximately centered with respect to the width W of the connector 10.

For ease of installation, the connector 10 may include one or more installation openings 40. The installation openings 40 are for receiving installation fasteners for securing the connector in position prior to installation of the shear fasteners 34 and tension fasteners 36. Preferably, the installation openings 40 are centered about the vertical axis of the connector 10.

In exemplary embodiments, any or all of the distances A, B, C, D may have the following relationships with respect to the lag screw and through bolt diameter of the shear fastener 34 that is received by each shear opening 30:

In keeping with the requirements for staggered fasteners in the 2001 National Design Standards for Wood Construction published by the American Forest and Paper Association, the distance A is equal to at least one and one half times, or alternatively approximately one and one half times, the diameter of the shear fastener 34 that is received by each shear opening 30.

The distance B is equal to at least six times, or alternatively approximately six times, the diameter of the shear fastener 34 that is received by each shear opening 30, wherein six times the diameter of the shear fastener 34 is also equal to four times the distance A.

The distance C is equal to at least seven times, or alternatively approximately seven times, the diameter of the shear fastener 34 that is received by each shear opening 30.

The distance D is equal to at least six times, or alternatively approximately six times, the diameter of the shear fastener 34 that is received by each shear opening 32.

The dimension F is selected to minimize the eccentricity $E_1$ and $E_2$ (as shown in FIG. 1B) between the back member 20 of the connector 10 and the anchor member 26 in the concrete foundation 28 for wood frame wall holdowns (HD).

The dimension F can be chosen to create a spacing large enough to accommodate 12 adjacent anchor member 26 diameters for paired anchor connectors (AC) attaching minimum 4-inch width wood roof members to concrete or masonry walls. A spacing of 12 anchor bolt 26 diameters minimum is required to develop the full anchor capacity in concrete walls.

Any or all of the distances A, B, C, D may be less than the minimums described above, however, this creates a risk of splitting the wood when the first building structural member 22 is wooden.

The following table shows exemplary embodiments of the connector 10 corresponding to the embodiments depicted in FIGS. 2A–5B. For clarity, each embodiment is referred to as FIG. 2, FIG. 3, . . . etc. rather than the embodiment depicted in FIGS. 2A–2B, the embodiment depicted FIGS. 3A–3B, . . . etc. Although the table depicts the use of ¼ inch diameter lag screw shear fasteners 34 and 5/16 inch diameter lag screw tension fasteners 36, nothing precludes the use of through bolts to develop required loads that exceed the particular limit of 24 shear fasteners 34. In the table, all dimensions are in inches except the design load capacity of the connector 10 which is given in pounds.

Figure 3A:
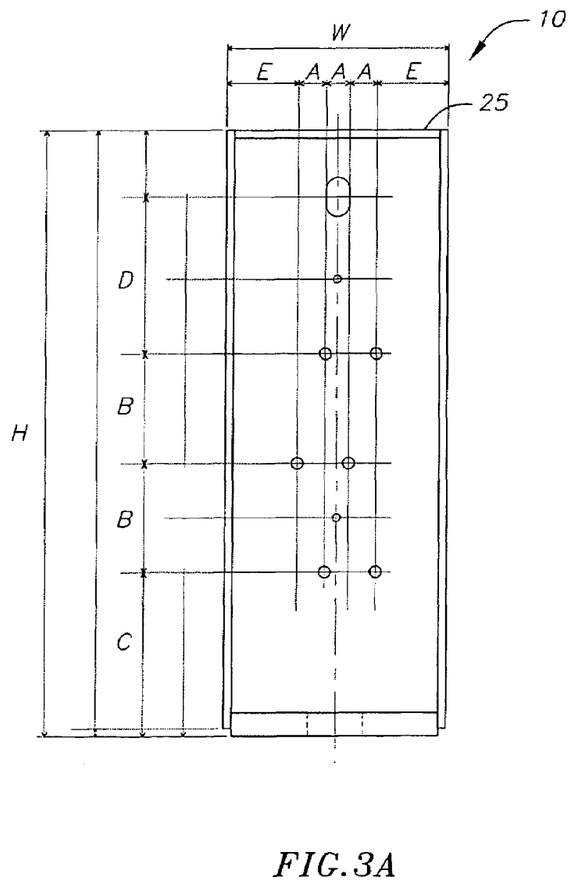
FIG. 3A is a front view of another exemplary embodiment of a connector according to the present invention.
Figure 3B:
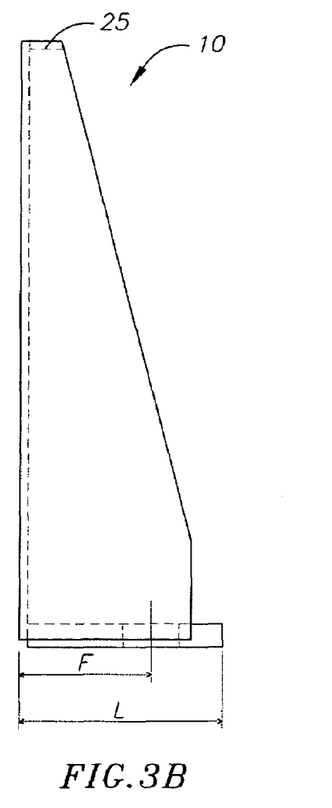
FIG. 3B is a side view of the connector of FIG. 3A.
Figure 4A:
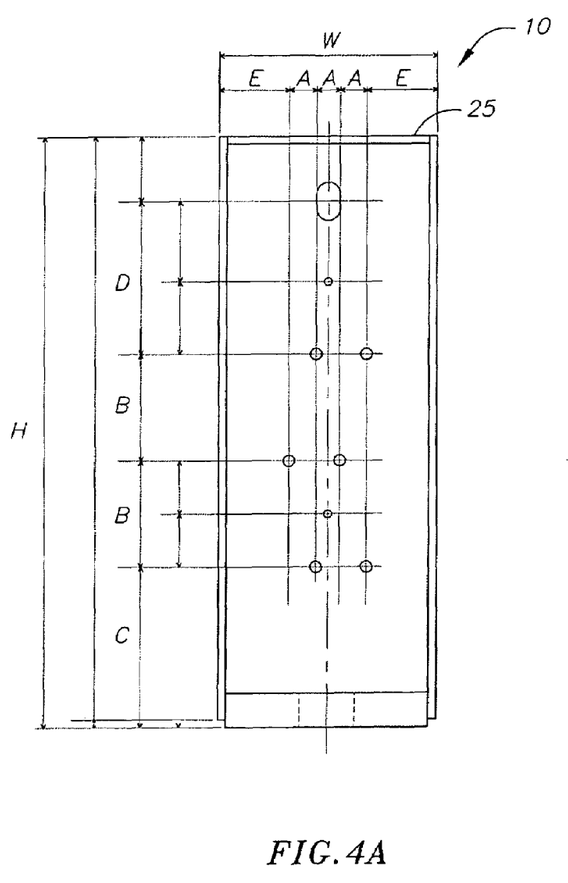
FIG. 4A is a front view of another exemplary embodiment of a connector according to the present invention.
Figure 4B:
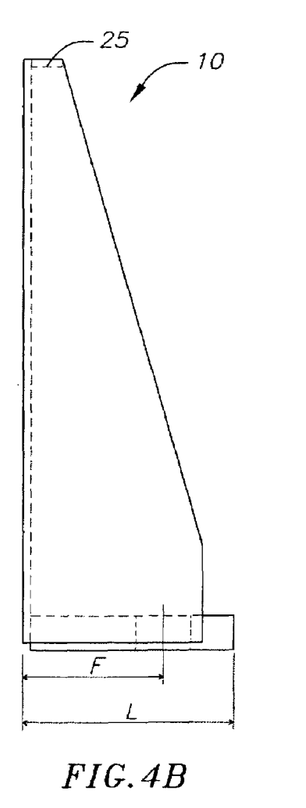
FIG. 4B is a side view of the connector of FIG. 4A.

|  | FIG. 2 | FIG. 3 | FIG. 4 | FIG. 5 |
|---|---|---|---|---|
| No. of rows 34 | 1 | 2 | 2 | 4 |
| No. of shear fasteners 34 | 4 | 6 | 6 | 10 |
| Dia. of shear openings 30 | 9/32 | 9/32 | 9/32 | 9/32 |
| Dimensions of shear fasteners 34 | ¼ Dia. × 2 Long | ¼ Dia. × 2 Long | ¼ Dia. × 1¾ Long | ¼ Dia. × 1¾ Long |
| No. of tension openings 32 | 1 | 1 | 1 | 2 |
| Dimensions of tension openings 32 | 7/16 × 11/16 | 7/16 × 11/16 | 7/16 × 11/16 | 7/16 × 11/16 |
| Dimensions of tension fasteners 36 | 5/16 Dia. × 1¾ Long | 5/16 Dia. × 1¾ Long | 5/16 Dia. × 1¾ Long | 5/16 Dia. × 1¾ Long |
| No. of installation openings 40 | 2 | 2 | 2 | 2 |
| Dia. of installation openings 40 | 5/32 | 5/32 | 5/32 | 5/32 |
| Dimension of installation fasteners | #6 Dia. × 1 Long | #6 Dia. × 1¼ Long | #6 Dia. × 1¼ Long | #6 Dia. × 1½ Long |
| Dia. of seat member opening 24 | 5/8 | ¾ | 5/8 | 7/8 |
| Dimensions of anchor screw 26 | ½ Dia. | 5/8 Dia. | ½ Dia. | ¾ Dia. |
| A | 3/8 | 3/8 | 3/8 | 3/8 |
| B | 1½ | 1½ | 1½ | 1½ |
| C | 1 7/8 | 1 7/8 | 1 7/8 | 1 7/8 |
| D | 1¾ | 1¾ | 1¾ | 1¾ |
| E | 5/8 | 5/8 | 5/8 | ¾ |
| F | 1 3/8 | 1¾ | 1 7/8 | 2¼ |
| H | 6 | 7½ | 7½ | 10½ |
| W | 2 3/8 | 2 3/8 | 2 3/8 | 2 5/8 |
| L | 2 | 2 1/8 | 2½ | 3½ |

Figure 6:
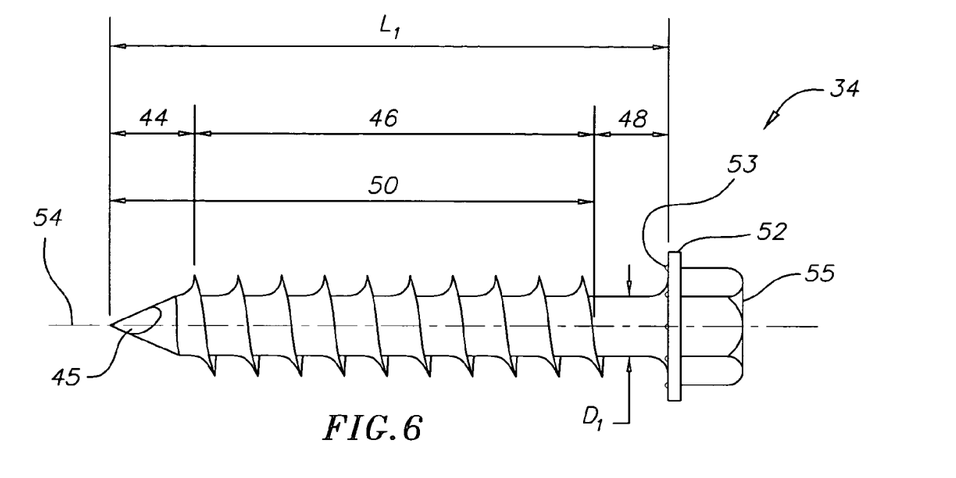
FIG. 6 is a side view of an exemplary shear fastener for use with a connector according to the present invention.

FIG. 6 shows an exemplary shear fastener 34 that may be used with the connector 10 of the present invention. The shear fastener 34 may be a lag screw or a standard through bolt, among other suitable fasteners. In the depicted embodiment, the shear fastener 34 is a specialized lag screw having a length $L_1$ that is divided into a tip section 44, a threaded shank section 46 and an unthreaded shank section 48.

The tip section 44 may include an angled cutting tip 45. In one embodiment, the cutting tip 45 has an angle of approximately 90 degrees with respect to a longitudinal axis 54 of the fastener 34. The cutting tip 45 facilitates inserting the shear fastener 34 into the first building structural member 22, such as a wooden stud or a wooden frame member. The 90 degree cutting tip 45 provides optimum cutting of wood grain to allow the shear fastener 34 to be installed using, for example, an electric drill without the need for predrilling an opening into the first building structural member 22.

In one embodiment, the shear fastener 34 has a shank diameter $D_1$ of ¼ inches and a length $L_1$ of at least 1¾ inches or alternatively approximately 1¾ inches. The 1¾ inch length is the optimum dimension when the first building structural member 22 is either a 2 inch thick wood member or a 4 inch thick wood member, since longer lengths could interfere with fasteners installed on an opposite side of the first building structural member 22, and the 1¾ inch length develops the same shear value or resistance to shear as longer lag screws that are 11 gage or thicker. Fasteners that are shorter than the 1¾ inch length develop a less than optimum shear value.

Preferably, the length $L_1$ includes a tip section length of approximately ¼ inch, a threaded shank section length of approximately 1 inch and an unthreaded shank section length of approximately ½ inch. In this embodiment, a threaded section 50 of the shear fastener 34 is at least or approximately 1¼ inches, which is, respectively, at least or approximately four times the diameter of the shank diameter $D_1$. The threaded section 50 may include rolled threads having, for example, 10 threads per inch. The ½ inch length of the unthreaded shank section 48 provides a full diameter bearing of the fastener against the grain of the wood when the first building structural member 22 is a wooden member.

In the depicted embodiment, the shear fastener 34 includes a head 55 having an integral washer 52 with locking nodules 53 extending therefrom, such that when the shear fastener 34 is inserted through one of the plurality of shear openings 30 in the back member 20 of the connector 10 and into the first building structural member 22, the locking nodules 53 bear into and secure the shear fastener 34 against the back member 20 of the connector 10. The head 55 with its integral washer 52 and locking nodules 53 is positioned adjacent to the unthreaded shank section 48 and in one embodiment, is a 3/8 inch hexagonally shaped head. In one embodiment, the shear fasteners 34 is composed of a steel material, such as cold head quality C1018 that is annealed, black oxide coated and waxed.

Figure 7:
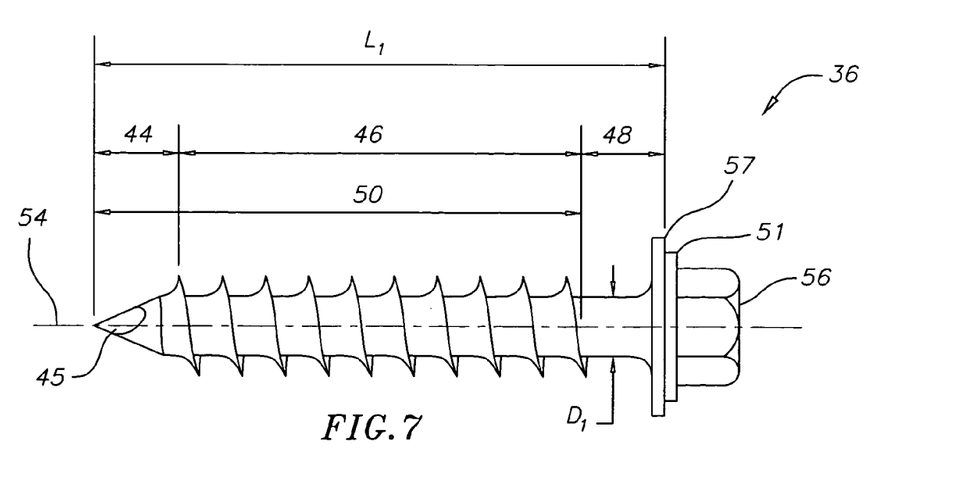
FIG. 7 is a side view of an exemplary tension fastener for use with a connector according to the present invention.

FIG. 7 shows an exemplary tension fastener 36 that may be used with the connector 10 of the present invention. The tension fasteners 36 is similar to the shear fasteners 34 except that preferably, the tension fastener 36 has a shank diameter D1 of 5/16 inches and rolled threads having, for example, 9 threads per inch. As with the shear fastener 34, preferably, the tension fastener 36 has a head 56 that is a 3/8 inch hexagonally shaped head so that the socket size is the same for both fasteners, shear 34 and tension 36. Currently available 5/16 inch diameter lag screws have a 7/16 inch hexagonally shaped head rather than the preferred ⅜ inch hexagonally shaped head for the tension fastener 36 of the present invention.

The tension fastener 36 includes an integral washer 51 formed with the head 56. A washer 57 may be loose from the head 56. When the tension fastener 36 is inserted through one of the at least one tension openings 32, such as a vertically slotted opening, in the back member 20 of the connector 10 and into the first building structural member 22, the washer 57 helps to minimize friction between the tension fastener 36 and the back member 20 of the connector 10.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, spirit and scope of this invention. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A connector for securing a first building structural member to a second building structural member comprising:
   a seat member having an opening for receiving an anchor bolt that secures the connector to the second building structural member;
   a first side member connected to the seat member;
   a second side member connect to the seat member; and
   a back member extending between the first and second side members, said back member being disposed substantially orthogonal to said seat member, wherein the back member includes a plurality of circular shear openings for receiving shear fasteners that secure the connector to the first building structural member and only resist shear forces that act on the connector in a direction substantially axial to the back member, and at least one tension opening comprising a slot having an elongated side disposed axial to the back member for receiving a tension fastener that secure the connector to the first building structural member and only resists tension forces that act on the connector in a direction substantially orthogonal to the axis of the back member.

2. The connector of claim 1, wherein the shear openings are arranged in at least two rows that each have at least two shear openings.

3. The connector of claim 2, wherein each row is laterally staggered from a vertically adjacent row.

4. The connector of claim 3, wherein each row is laterally staggerred from a vertically adjacent row by a distance from of at least 1½ times the diameter of the shear fasteners that are inserted into the plurality of shear openings.

5. The connector of claim 2, wherein each shear opening of each row is vertically spaced apart by a distance of at least six times the diameter of the shear fasteners that are inserted into the plurality of shear openings.

6. The connector of claim 2, wherein a lowermost row of the at least two rows is vertically spaced from a bottom surface of the seat member by a distance of at least seven times the diameter of the shear fasteners that are inserted into the plurality of shear openings.

7. The connector of claim 2, wherein each of the at least one tension openings is vertically spaced apart from an uppermost row of the at least two rows by a distance of at least six times the diameter of the shear fasteners that are inserted into the plurality of shear openings.

8. The connector of claim 1, wherein each shear fastener is a lap screw, and each tension fastener is one of either a lag screw or a through bolt, and wherein each lag screw has a length that is divided into a tip section a threaded shank section that is adjacent to and integrally formed with the tip section and an unthreaded shank section that is adjacent to and integrally formed with the shank section, wherein the tip section includes an angled cutting tip.

9. The connector of claim 8, wherein each shear fastener lag screw has a length of approximately 1¾ inches, an unthreaded shank section length of approximately ½ inch, an approximately ⅜ inch hexagonally shaped head and a diameter of approximately ¼ inch, and wherein each tension fastener lag screw has a length of at least 1¾ inches, an unthreaded shank section length of at least ½ inch, an at least ⅜ inch hexagonally shaped head, and a diameter of at least ¼ inch.

10. The connector of claim 1, wherein each shear fastener comprises a head, wherein each head has an underside having a plurality of locking nodules disposed thereon.

11. The connector of claim 1, further comprising a reinforcing member extending between and connected to the first and second side members.

12. The connector of claim 11, wherein the reinforcing member extends from an upper portion of the back member.

13. A connector for securing a first building structural member to a second building structural member comprising:
   a seat member having an opening for receiving an anchor bolt that secure the connector to the second building structural member;
   a first side member connected to the seat member;
   a second side member conned to the seat member; and
   a back member extending between the first and second side members, said back member being disposed substantially orthogonal to said seat member, wherein the back member includes a plurality of circular shear openings for receiving shear fasteners that secure the connector to the first building structural member and only resist shear forces that act on the connector in a direction substantially axial to the back member, and at least one tension opening comprising a slot having an elongated side disposed axial to the back member for receiving a tension fastener that secures the connector to the first building structural member and only resists tension forces that act on the connector in a direction substantially orthogonal to the axis of the back member, wherein the shear openings are arranged in at least two rows that each have at least two shear openings and wherein each row is laterally staggered from a vertically adjacent row.

14. The connector of claim 13, wherein each row is laterally staggered from a vertically adjacent row by a distance from of approximately 1½ times the diameter of the shear fasteners that are inserted into the plurality of shear openings.

15. The connector of claim 13, wherein each shear opening of each row is vertically spaced apart by a distance of approximately six times the diameter of the shear fasteners that are inserted into the plurality of shear openings.

16. The connector of claim 13, wherein a lowermost row of the at least two rows is vertically spaced from a bottom surface of the seat member by a distance of approximately seven times the diameter of the shear fasteners that are inserted into the plurality of shear openings.

17. The connector of claim 13, wherein each of the at least one slotted tension openings is vertically spaced apart from an uppermost row of the at least two rows by a distance of approximately six times the diameter of the shear fasteners that are inserted into the plurality of shear openings.

18. The connector of claim 13, wherein each shear fastener is a lag screw, and each tension fastener is one of either a lag screw or a through bolt, and wherein each lag screw has a length that is divided into a tip section; a threaded shank section that is adjacent to and integrally formed with the tip section and an unthreaded shank section that is adjacent to and integrally formed with the shank section, wherein the tip section includes an angled cutting tip.

19. The connector of claim 18, wherein each shear fastener lag screw has a length of approximately 1¾ inches, an unthreaded shank section length of approximately ½ inch, an approximately ⅜ inch hexagonally shaped head and a diameter of approximately ¼ inch, and wherein each tension fastener lag screw has a length of at least 1¾ inches, an unthreaded shank section length of at least ½ inch, an at least ⅜ inch hexagonally shaped head, and a diameter of at least ¼ inch.

20. The connector of claim 18, wherein each shear fastener comprises a head, wherein each head has an underside having a plurality of locking nodules disposed thereon.

21. The connector of claim 13, further comprising a reinforcing member extending between and connected to the first and second side members.

22. The connector of claim 21, wherein the reinforcing member extends from an upper portion of the back member.

* * * * *